May 22, 1962 R. GILMONT 3,035,600
PRESSURE SETTING AND HOLDING DEVICE
Filed Nov. 1, 1956 2 Sheets-Sheet 1
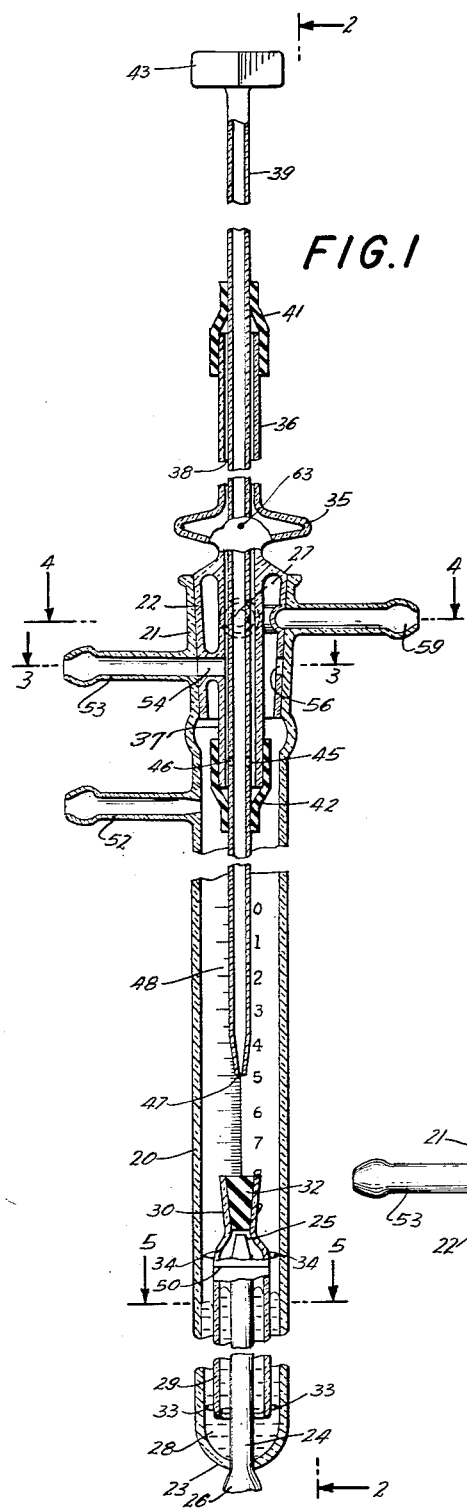
INVENTOR.
ROGER GILMONT
BY A. A. Orlinger.
ATTORNEY May 22, 1962 R. GILMONT 3,035,600
PRESSURE SETTING AND HOLDING DEVICE
Filed Nov. 1, 1956 2 Sheets-Sheet 2
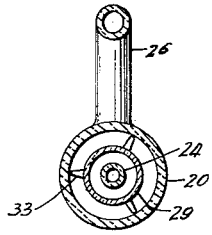
FIG.5
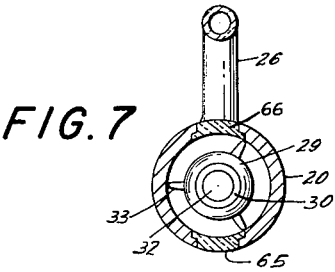
FIG.7
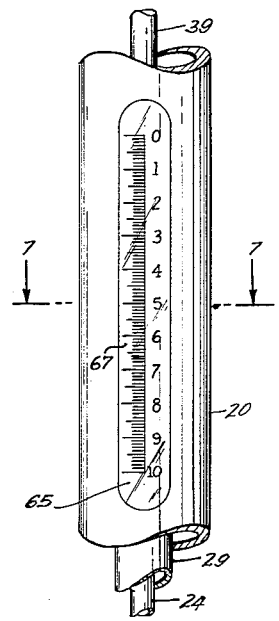
FIG.6
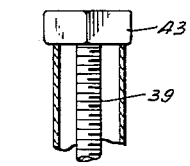
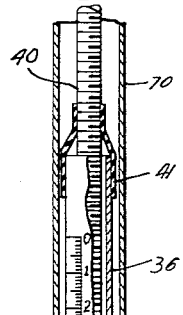
FIG.8
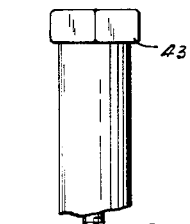
FIG.9
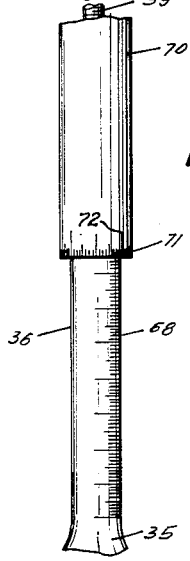
INVENTOR.
ROGER GILMONT
BY *A. A. Orlinger*
ATTORNEY ID 3,035,600
Patented May 22, 1962

1

3,035,600
PRESSURE SETTING AND HOLDING DEVICE
Roger Gilmont, Douglaston, N.Y., assignor to Manostat Corporation, New York, N.Y., a corporation of New York
Filed Nov. 1, 1956, Ser. No. 619,720
7 Claims. (Cl. 137—247)

This invention involves improvements in manostat devices of the type shown in my February 15, 1955, U.S. Patent No. 2,702,047. Their basic theory, design and fundamental operation, as available before this invention, are explained in my papers "Theory and Operation of a Cartesian Diver Type of Manostat" in the Analytical Edition of Industrial and Engineering Chemistry, volume 18, No. 10 (October 15, 1946) page 633, and "Design and Operational Characteristics of Cartesian Manostats" in Analytical Chemistry, volume 23, January 1951, page 157.

This invention includes in these manostats the improvement which enables the desired or selected pressure at which the system to be controlled is to be operated and which is to be maintained in it by this improved manostat, to be set initially directly with this improved device itself and without using in addition a separate pressure gauge or manometer in setting it at each different vacuum or pressure level, as is needed with the heretobefore available manostats.

The invention includes also improvements in means for regulating the flow of fluids (gases or vapors) inside and outside of the pressure maintaining float, whereby such means serves as a single control manipulator, the selected changes in position of which permit readily modifying the device to render at will a different one of the several uses available from it according to this invention. Thus, the improved manostat of this invention can serve selectively, for example, as a vacuum or pressure setting and maintaining device, as a vacuum or pressure gauge (absolute or differential), and to set and maintain a pressure relative to another.

FIGURE 10 of my above identified paper in Analytical Chemistry for January 1951 shows the arrangement of apparatus needed each time the manostat available before this invention is to be set to maintain a different vacuum or pressure level in a system wherein the pressure is to be controlled by the device. That arrangement is limiting on the device and also introduces additional possibilities for leakages. Moreover, the manostats heretofore available are limited merely to vacuum and pressure setting and maintaining pressure.

These restrictions and limitations of the earlier manostats are overcome and avoided by the improvements of this invention. Considered broadly, the invention involves indicating means associated with the manostat whereby the various elevations of the orifice tube control the indication of the level of the pressure for the respective elevations and thereby also set the device to maintain in a system to be controlled the particular selected level of vacuum or pressure.

Considered broadly further, the invention involves a manostat having a tubular gas-tight body with a central tube entering its interior near, and extending upwardly away from its, bottom; in the lower part of that body and around the lower part of the central tube a quantity of a motile liquid (e.g. mercury) inert to the gaseous fluids to be handled by the device; an open-bottomed and closed top pressure setting and adjusting float loosely telescoped over the central tube and dipping into and supported by that liquid for motion vertically in relation to the central tube; a closure or stopcock rotatable about its vertical axis and closing off the top of the manostat in gaseous-fluid-tight engagement in its upper end (i.e. neck

2 portion); a connecting-tube connecting the outer end of the central tube with the inner wall of the neck through a connecting-tube orifice passing through the neck and opening into its inner wall; a venting conduit leading from a venting orifice in the inner wall of the neck to the outside of the manostat; a vertical hollow tube fixed in, and extending above, said closure and also entering the upper part of the manostat; an orifice tube, closed at its upper end and terminating in an orifice at its lower end, passing longitudinally through, and spaced away from the inner wall of, the hollow tube and mounted for vertical axial movement through it with the ends of the orifice tube extending beyond the ends of the hollow tube and the latter ends being in gaseous-fluid-tight engagement with the orifice tube; a gaseous-fluid passage in the wall of the orifice tube intermediate the extremities of the hollow tube; a cross-cut gaseous-fluid passage in the closure with its ends communicating only with an inside surface of the closure and so positioned in it to establish communication between the connecting-tube orifice and the venting orifice when the closure is in its so-called differential position; two gaseous-fluid passages in the closure each having its inner end communicating with the hollow cylinder and intermediate its extremities and its outer end so located that in one position of the closure, namely, the differential position, the first of these two passages communicates with the orifice-tube-connection or operating conduit and the other end of the second of these two passages communicates with that conduit when the closure is rotated about its axis to a second position designated the operating position and breaks the communication of the cross-cut passage with the connecting-tube orifice and venting orifice; a fourth passage in the closure communicating with the manostat interior, and a fifth passage in the closure also communicating with that interior, both said passages being located relative to one another and the other passages in the closure that the fourth passage places the manostat interior in communication with the operating conduit when the fifth passage places that interior in communication with the connecting tube (to the central tube) and all other passages in the closure are closed off; and a pressure-maintaining conduit outside of the manostat and at a level below the closure and above the highest level to be reached along the inner wall of the manostat by the liquid, leads from the manostat interior to outside of it; the orifice tube and the central tube being so aligned relative to one another that with sufficient excess pressure on the outside of the adjusting float the underside of its top closure can close the orifice of the central tube, and then with sufficient excess pressure on the underside of the adjusting float the top of its closure can close the orifice of the orifice tube.

The closure is in its so-called differential position when the manostat is set to control one pressure relative to another other than atmospheric, as mentioned below in column 7, lines 65–72, and referred to generally in column 1, lines 37–40.

The improved manostat of the invention can be made of any material generally leakproof to gaseous fluids, the selection of which is governed by inertness to the fluids to be handled and the nature and magnitude of the operation to which it is to be applied, for example, laboratory, pilot plant, or production and the magnitude of the latter. The nature of the invention can be described more conveniently in relation to a glass embodiment of it. Accordingly, the invention is illustrated by, but not restricted to, its embodiment shown in the accompanying drawings, wherein FIGURE 1 is a vertical cross-section through the axis of the device and its side-arms that connect to the system to be controlled and to the source of vacuum or pressure, and showing the central tube and parts of other parts in elevation.

FIG. 2 is a foreshortened side elevation, and partially in broken section, taken at an angle of ninety degrees counter-clockwise to the view of FIG. 1, and looking in the direction of the arrows marked 2, i.e. into the highest positioned side-arm (which in this modification generally communicates with the atmosphere);

FIG. 3 is a horizontal cross-section along the line 3—3 of FIG. 1, and looking in the direction of the arrows;

FIG. 4 is a horizontal cross-section along the line 4—4 of FIG. 1, and looking in the direction of the arrows;

FIG. 5 is a horizontal cross-section along the line 5—5 of FIG. 1, and looking in the direction of the arrows;

FIG. 6 is a vertical fragmentary view of a portion of an opaque metal embodiment of the manostat, and showing the vacuum or pressure scale through the front viewing window in the outer cylindrical body of the device;

FIG. 7 is a horizontal cross-section along the line 7—7 of FIG. 6;

FIG. 8 is a fragmentary front elevation of the upper tubular extension of the rotatable closure of an opaque metal embodiment of the manostat, and showing another embodiment of the scale for indicating vacuum or pressure, in form of an outside scale and tubular indicator; and FIG. 9 is a vertical cross-section along the axis of the embodiment of the scale indication shown in FIG. 8.

As seen in FIGURES 1, 2, 5, 6 and 7, the manostat of the invention has an upright cylindrical body 20 having at its top an open neck 21. The latter advantageously is slightly, inverted frusto-conical to receive the specially constructed stopcock 22 (also part of the invention) rotatable about its vertical axis within the neck. Body 20 has a closed bottom 23 through which there enters and reaches up into the cylinder the central pressure equalizing tube 24 terminating in its orifice 25 and from, and connecting with, the outside connecting tube 26. The latter rises outside, and conveniently axially parallel to the axis, of body 20 and then joins neck 21 at the open junction 27 with it.

A supply of mercury 28 is contained in the lower part of body 20. Open-bottomed setting and adjusting float 29 is supported in the mercury and concentrically surrounds central tube 24, entrapping a quantity of gas above the mercury and below the float's contracted neck 30 closed gas-tight by rubber plug 32. Obviously, the material of which float 29 is made is of lower specific gravity than the mercury, so that float 29 as a whole is buoyantly supported by the mercury.

Peripherally equidistantly spaced guide tips 33 near the lower end of float 29 and similar guide tips 34 near its upper end keep the float uniformly spaced from the inner wall of body 20 and outer wall of central tube 24 during any upward and downward movement of the float.

Above its main body which serves to close neck 21, stopcock 22 has an integral turning handle 35 from which there extends axially upwardly the upper portion 36 of the vertical central cylindrical conduit 37 which runs coaxially through the stopcock and with its lower end terminating somewhat below the bottom of the stopcock.

Orifice tube 39 is positioned coaxially within central cylindrical conduit 37 with the latter's inner wall spaced away from the outer wall of the former. Rubber sleeve 41 surrounding orifice tube 39 and the upper end of central cylindrical conduit 37, together with rubber sleeve 42 also surrounding orifice tube 39 and the lower end of cylindrical conduit 37, form a gas-tight cylindrical chamber 38 surrounding orifice tube 39, but through which chamber the orifice tube can be moved axially longitudinally in gas-tight engagement with sleeves 41 and 42, by raising or lowering the orifice tube, conveniently by handle 43 at its upper end.

Gas-tight cylindrical chamber 38 (surrounding orifice tube 39) communicates with the interior of tube 39 through one or more orifice tube ports 45 and 46, and then through the tapered end of the orifice tube, and its orifice outlet 47, communicates in turn with the interior of body 20 of the manostat and outside of float 29. Sidearm 52 communicates with the inside of the manostat above float 29.

A vacuum or pressure indicator scale 48, conveniently divided into one hundred equal subdivisions in main groups of ten each and subgroups of five each, and with a set of vacuum or pressure indicating numerals from zero to ten, is affixed to body 20, suitably at its back as in FIG. 1, for example, by decalcomania or etching. A horizontal indicator line 50 scratched or etched about the upper end of float 29 conveniently just below its shoulder and upper guide tips 34, assists in noting the setting as hereinafter explained, in relation to any selected level line on scale 48.

Hollow operating side-arm 53 extends outwardly from neck 21 of the manostat and joined to it at such a level to communicate (a) through radial bore 54 in stopcock 22 with chamber 38 (between orifice tube 39 and cylindrical conduit 37) when the stopcock is positioned as seen in FIG. 1; (b) through radial bore 55, located horizontally at right angles to bore 54, likewise with chamber 38 when stopcock 22 is turned ninety degrees clockwise (in FIG. 3); and (c) in registry with, and through, stopcock port 56 with the space above float 29, when stopcock 22 is rotated one hundred and eighty degrees from its position in FIGS. 1 and 2.

Similarly, hollow vent side-arm 59 extends outwardly from neck 21 and joined to it at a level to communicate, through the open end 60 of stopcock cross-cut 61 and its other open end 27, with the outside connecting tube 26 when stopcock 22 is positioned as seen in FIGS. 1, 2 and 4. In addition, side-arm 59 is placed in registry with, and through upper stopcock port 62, communicates with the space above float 29 when stopcock 22 is rotated ninety degrees counter-clockwise from its position in FIGS. 1, 2 and 4. In that so turned position, stopcock turning handle 35 then would be seen in FIG. 2 in the same elevation of it that appears in FIG. 1, and stopcock-position-indicating blue spot 63 would be facing directly forward.

FIGS. 6 and 7 represent an arrangement for viewing the vacuum or pressure level indicating scale in a modification wherein the manostat body is made of opaque material. In such modification, a viewing window 65 is fixed in gas-tight fit in manostat body 20, and the scale 67 is mounted (by etching or decalcomania) on a glass scale window 66 mounted also in gas-tight fit in body 20 and diametrically opposite scale-viewing window 65.

Instead of having windows 65 and 66 in a modification where body 20 is of opaque material, FIGS. 8 and 9 illustrate a further modification wherein scale 48 and indicator line 50 are omitted from the interior of the device. In this particular modification a vacuum or pressure indicating scale 68 is affixed (by etching or decalcomania) to the upper portion 36 of cylindrical conduit 37 and an indicator cylinder 70 is rigidly affixed to, and suspended from, handle 43 at the upper end of orifice tube 39 which is raised or lowered by its outside threads 40 turning one way or the other in registry with inside threads in the upper and narrow portion of gaseous-fluid-tight bushing 41. The vertical markings 71 around the lower edge of the cylinder 70 serve as micrometer additions to the readings on scale 68. For example, the vertical marking 72 of said vertical markings, serves as the zero starting point from which to measure such addition by the number of such vertical markings by which said zero starting point has been removed from the fixed reference line which is the right hand vertical line of scale 68 (as in FIGURE 9).

The particular spacing between the indicating lines on vacuum or pressure scale 48, or scale 67 of the modification of FIGS. 6 and 7, varies from the actual numerical millimeters of vacuum or pressure by a magnification factor, designated K, which varies in relation to the respective inside diameter of body 20, inside and outside diameters of float 29 and the outside diameter of the pressure equalizing central tube 24. Therefore, if the scale is prepared with the indication lines uniformly one millimeter above each other, the reading on scale 48, and likewise on scale 67, would need to be divided by the magnification factor K to give the correct vacuum or pressure in millimeters.

To avoid that inconvenience, the scale can be prepared initially to give the actual pressure in millimeters directly from a reading of the indication lines, by spacing them apart the distance of one millimeter multiplied by the value of K. This factor K equals the sum of $A_2$ and $rA_1$ divided by the difference between $A_3$ and $rA_3$, wherein $A_1$ equals the area of the annulus between the inside wall of body 20 and the outside wall of float 29 (or in other words, the difference between the areas of two circles, the diameter of the first being the inside diameter of body 20 and the diameter of the second being the outside diameter of float 29);

$A_2$ equals the area of the annulus between the inside wall of float 29 and the outside wall of central tube 24 (or in other words, the difference in areas between two circles, the diameter of the first being the inside diameter of float 29 and the diameter of the second being the outside diameter of central tube 24);

$A_3$ equals the area of the horizontal cross-section of the wall of float 29 (or in other words, the difference in areas between two circles, the diameter of the first being the outside diameter of float 29 and the diameter of the second being its inside diameter);

$r$ equals the ratio of $A_0$ to A, where $A_0$ is the area of a circle having the outside diameter of central tube 24; and A is the area of the horizontal cross-section bounded by the inside wall of body 20 (in other words, the sum of $A_0$, $A_1$, $A_2$ and $A_3$).

In other words, $r$ equals the square of the ratio of the outside diameter of central tube 24 to the inside diameter of body 20.

Alternatively, the locations for the vacuum or pressure indication lines on scale 48 can be determined by calibration against an existing manometer scale.

In assembling the monostat of the invention, a suitable quantity of mercury or other non-wetting liquid (i.e. one that will not wet the manostat parts) is fed into the inside of body 20, by holding it suitably inclined, through neck 21 and running it carefully down a portion that has no openings. Rubber orifice sealing plug 32 is lubricated at its top and bottom and sides with a minimum quantity of high vacuum grease, e.g. a silicone high vacuum grease, to insure tight seal on its insertion in the contracted neck 30 of float 29 and also when it is to contact with orifices 25 and 47. To the outer ends of the sets of guide tips 33 and 34 are applied extremely thin films of silicone grease to reduce sliding friction. While still holding the body 20 slightly inclined, float 29 is inserted with its open end first through neck 21 and allowed to slide down to encircle central pressure equalizing tube 24 and to reach, and settle in, the mercury and thereby entrap a quantity of gas between the mercury and the underside of the float.

The inside of each of the rubber sleeves 41 and 42 is carefully lubricated with a minimum quantity of high vacuum grease, to permit easy longitudinally axial movement of orifice tube 39 and for it yet to remain under vacuum at any position at which it is set. It is then inserted in cylindrical conduit 37 of stopcock 22, and sleeves 41 and 42 are slipped over the open ends of cylindrical conduit 37. Stopcock 22 is then lubricated with the silicone high vacuum grease and fitted into tight engagement in neck 21.

To complete the arrangement of the monostat for use, stopcock 22 is turned by its handle 35 to the equilibrium position, i.e. at one hundred and eighty degrees from that shown for it in FIGURES 1 through 4. In that position upper stopcock port 62 is in registry with open junction 27 and thus with the upper end of, and communicates with, outside connecting tube 26. In that way, the space inside of float 29 above the mercury and that outside of the float are joined through connecting tube 26 and central tube 24. Thereby the pressure inside and outside of float 29 is equalized (i.e. is the same).

Orifice tube 39 then is raised so that its orifice 47 is above the zero line of scale 48 a distance at least equal to, and preferably over, that between indicator line 50 and the top of rubber plug 32. Then additional mercury is introduced into body 20 through side-arm 52 (e.g. through a small funnel connected to it by a short piece of flexible tubing) until indicator line 50 is elevated to be coincident with the level of the zero line of scale 48. The instrument now is ready for any of its several uses.

*For absolute pressure control.*—A needle valve is connected with pressure-maintaining side-arm 52. Operating side-arm 53 is connected to a high vacuum source (e.g. a high vacuum pump). With the needle valve closed, the vacuum is applied until all of the air is exhausted from the manostat. Stopcock 22 is then turned by its handle 35 clockwise ninety degrees to the operating position (with position-indicator dot 63 facing left in FIG. 1). The vacuum now is closed off. Air is carefully admitted through the needle valve completely to fill the underside of float 29 with mercury (i.e. until float 29 settles to where orifice tip 25 is contacted by the bottom of rubber plug 32 and the mercury 28 has risen in the meantime on the inside of float 29 till no more air can be seen entrapped inside the float) and to restore atmospheric pressure about the outside of float 29. The manostat is now ready for connection by a conduit for gaseous fluids to a system that is to be evacuated and held at a selected vacuum level, to set or establish the selected absolute vacuum and control it at that level.

To accomplish this, operating side-arm 53 is still connected with the vacuum source, and side-arm 52 is connected to the system to be evacuated. Orifice tube 39 is lowered to position orifice tip 47 to about a level above the line on indicator scale 48 for the desired vacuum value to be maintained, equal to that from indication line 50 to the top of plug 32. The evacuation is started. Float 29 rises until the top of rubber plug 32 contacts orifice 47 as the extent of evacuation reaches the level set. The elevation of orifice 47 now is adjusted so that indicator line 50 on float 29 coincides with the line on indicator scale 48 for the exact vacuum value desired.

When the pressure tends to increase in the system due to any leakage, the pressure will correspondingly increase in the space above float 29. The latter then will drop somewhat, and thereby pull the top of rubber plug 32 away from orifice 47. As a result, the vacuum again is applied to the system, through side-arm 53, stopcock bore 54, cylindrical chamber 38 connecting through ports 45 and 46 with the inside of orifice tube 39 and orifice 47 and through side-arm 52 to the system that is being maintained at the selected vacuum level. When the vacuum again is returned to the level set by the position of orifice 47, float 29 rises until the top of its rubber plug 32 again contacts orifice 47 and shuts off the vacuum. These operations are repeated each time the pressure in the system rises as a result of leakage.

*Pressure control relative to atmosphere.*—As already stated, the manostat of the invention can control pressures relative to atmospheric pressure, or in other words, gauge pressures. To adjust the manostat for that purpose after its use in absolute pressure control as described above, atmospheric pressure must be restored under float 29.

This is done by raising orifice tube 39 to be sure the bottom of rubber plug 32 is above and away from orifice 25 of central tube 24; and while the manostat is under vacuum, stopcock 22 is turned by its handle 35 counterclockwise ninety degrees, back to the equilibrium position (as described in column 6, above, i.e. with indicator spot 63 in back of handle 35 when looking at FIG. 1). Air is then admitted through side-arm 53 and the pressure outside, and inside, of float 29 is equalized.

Stopcock 22 then is turned by its handle 35 one hundred and eighty degrees from its equilibrium position (i.e. to the position shown in FIGS. 1 through 4 with stopcock position-indicating spot 63 facing forward in FIG. 1 and to the left as seen in FIG. 2). Venting side-arm 59 thereby communicates through stopcock cross-cut 61 with outside connecting tube 26 and through pressure equalizing central tube 24 restores atmospheric pressure under float 29. Any connection previously on side-arm 53 is removed, thereby leaving it open to the atmosphere. Side-arm 52 is connected to the system to be controlled. The latter then is connected through a needle valve to a suitable pressure source, e.g. a compressor.

Orifice tube 39 is then adjusted in elevation until indicator line 50 on float 29 coincides with the line on scale 48 for the desired pressure to be controlled. With orifice 47 closed off by contact with the top of rubber plug 32, the pressure is maintained on the system to be controlled in correspondingly similar manner to that described above for the vacuum control. However, in this case whenever the pressure in the system rises above that to be controlled, the increased pressure communicated to the outside of float 29 depresses it and lowers the top of plug 32 from orifice 47. Thereby, compressed gas enters orifice tube 39, passes through its ports 45 and 46 into cylindrical chamber 38 and through radial bore 54 escapes through side-arm 53 to the air. The pressure in the system thereby is reduced. On its return to the level set to be controlled, the reduced pressure outside of float 29 allows it to be raised until the top of plug 32 contacts, and closes off, orifice 47, thereby discontinuing further gas escape to the atmosphere. When the pressure in the system again should rise above that for which the device is set, the just described operations are repeated.

When operating at pressures under which stopcock 22 might be raised from its tight fit in neck 21 and/or there is escape of air or other gas around rubber sleeves 41 and 42, or other rubber connection in the system, suitable clamps should be used on the stopcock and the various rubber connections to hold them against such pressure.

To control negative pressures relative to atmospheric pressure (i.e. negative gauge pressures), the same procedure as just above described is followed, except that the equilibrium position for float 29 is adjusted by reduction of the quantity of mercury until indicator line 50 reads on the high figure, e.g. ten, on scale 48 rather than its zero point. The in addition, a source of vacuum is connected to side-arm 53, and the previous pressure source is removed from the needle valve connection to the system to be controlled. In this use (controlling negative pressures), the readings on indicator scale 48 are reversed, so that the correct negative pressure is obtained by subtracting the maximum of the scale (e.g. ten) from the actual reading on it for the particular operation.

*For differential pressure control.*—The monostat of the invention can serve also to control one pressure relative to another other than atmospheric. That is accomplished in the same manner as above described for controlling pressure relative to atmosphere, except that side-arm 53 is not open to the atmosphere, but rather is connected to the system that is under the pressure relative to which the second system is to be controlled.

*For vacuum gauge use.*—This new manostat also can be used as a vacuum gauge. For such use, the instrument is prepared in the same way as it is for use in absolute pressure control up to the point of pumping it down to a high vacuum while the needle valve is closed. Then stopcock 22 is turned by its handle 35 counterclockwise ninety degrees from its position shown in FIGURES 1 through 4 (i.e. with stopcock position-indicating spot 63 facing side-arm 59) That connects the outside of float 29 with side-arm 59 and closes off connection with side-arm 53 and outside connecting arm 26 and central tube 24. Orifice tube 39 is raised high enough for orifice 47 to remain clear of contact with the top of plug 32 of float 29. Then to serve as a vacuum gauge side-arms 52 and 59 are connected directly to the vacuum system to be measured. If the scale was not specifically designed for giving the exact vacuum reading, then the actual vacuum in centimeters of mercury is calculated by dividing the scale reading (shown by the elevation of indicator line 59 on scale 48) by the multiplication factor K for the particular float 29 being used.

Operation of the modification indicated by FIGURES 6 and 7 duplicates that above described.

Similarly, operation of the modification indicated by FIGURES 8 and 9 parallels that already described above, with the exception that no level-indication line as line 50 is needed on float 29, and the selected level settings of orifice 47 are made with the guidance of outside scale 68 by setting the lower edge of indicator cylinder 70 at the particular position along scale 68 corresponding to the selected or desired pressure or vacuum.

If the entire body 20 is opaque in the modification indicated by FIGURES 8 and 9, that modification cannot serve as a vacuum or pressure gauge. However, by providing a sight-glass in the front and another in back to allow the operator to observe when orifice 47 is brought in contact with the top of rubber plug 32, by turning cylinder 70 to adjust the position of the threads of orifice tube 39 in bushing 41, that modification also can be used as a vacuum or pressure gauge.

The various parts of the manostat are not limited to the specific sizes and relative proportions indicated by the drawings. The location of adjusting conduit 52 is not fixed. It may be at some other location below the stopcock or closure so long as it is at a level above that which may be reached by the non-wetting liquid such as mercury during use of the instrument.

The various elevations and shapes and courses of the ports in orifice tube 39 and stopcock or closure 22 and of outlet conduits from neck portion 21 may be varied so long as each is positioned relative to certain of the others to operate with respect to such of the others with which it is to operate respectively in the manner already described. A float 29 of different weight or other suitable cross-section can be used with corresponding change, when needed, in the value of the graduations on the scale. Obviously, float 29 can be made of such suitable material as may be desired, which may be influenced by the nature of the material from which body 20 is made and the gaseous fluid to be handled. In any event, whatever material is used for float 29, the motile liquid, such as mercury, inert to the gaseous fluids to be handled by the device, is of higher specific gravity than that of the material of float 29 so that the latter as a whole should be buoyant, as hereinabove shown.

While the invention has been explained by detailed description of certain specific embodiments of it, it is understood that various modifications and substitutions may be made in any of the specific embodiments within the scope of the appended claims which are intended to cover also equivalents of the various specific embodiments.

What is claimed is:

1. A manostat comprising a closed body for holding a quantity of a non-wetting liquid in its lower part; a tubular float closed at its upper end and to be supported with its open lower end protruding into said liquid; an opening in an upper part of the closed body; a hollow orifice tube passing through said opening and supported therein, for longitudinally axially to and fro movement therethrough in gaseous-fluid-tight relation thereto, by gaseous-fluid-tight engaging means encircling the orifice tube and connecting said opening with the outer wall of that tube, and for the hollow interior of said tube to be put into communication with a source of pressure or vacuum; said tube having an orifice at its end extending into the interior of the closed body and being directed downwardly toward the closed top of the float; the elevation of the orifice being thus adjustable such that with the quantity of liquid to be added the top of the float closes the orifice when a specific pressure is exerted on the outside of the float and the float is depressed by a change from that pressure to separate its top from contact with the orifice; a pressure or vacuum level indicating means movable responsive to the particular elevation of the orifice, and a pressure indicating scale held in a position associated with the body of the manostat and outside of the orifice tube and so positioned in relation thereto for said indicating means as it is moved axially longitudinally responsive to the particular elevation of the orifice to indicate on said scale the corresponding pressure or vacuum setting or reading.

2. A manostat as claimed in claim 1, wherein the pressure indicating scale is arranged vertically within the body of the instrument and located near the path traversed by the orifice at its various elevations under the different pressures, and the body of the instrument is transparent at least in the parts of it that can enable reading the different pressures that can be indicated on the scale by the indicator.

3. A manostat as claimed in claim 2, wherein the body of the manostat is transparent and the pressure reading scale is applied on the wall of the body at an elevation parallel to the path traversed by the various elevations of the orifice; and the figures on the scale are placed so that on reading them they appear as being behind the orifice tube; and the float is transparent and bears near its top a horizontal line serving as the indicating line, the position of which when read against the scale in back of it, gives the reading on the scale for the specific pressure condition involved.

4. A manostat as claimed in claim 1, wherein the body of the manostat is opaque and the pressure indicating scale and the indicating means for designating the pressure on the scale are located outside of the body of the instrument.

5. A manostat having a tubular gas-tight body with a pressure equalizing tube entering the interior thereof near, and extending upwardly away from, its bottom and terminating in the interior of said body in an orifice; the lower part of said body and around the lower part of the pressure equalizing tube being for holding a quantity of a non-wetting motile liquid inert to the gaseous fluids to be handled by the device; an open bottomed and closed top pressure-setting-and-adjusting float loosely telescoped over the pressure equalizing tube and to be held with its open lower end dipping into and supported by that liquid for motion vertically in relation to said tube; a neck portion at the upper end of the body; a closure rotatable about its vertical axis and in said neck portion and in gaseous-fluid-tight engagement therewith to close it; a connecting-tube connecting the bottom end of the pressure equalizing tube with the interior wall of the neck through a connecting-tube orifice passing through the neck and opening through the interior wall thereof; an exterior venting conduit extending outwardly from and communicating with a venting orifice passing through the wall of the neck; an exterior operating conduit extending outwardly from and communicating with an operating orifice passing through the wall of the neck and spaced away from the venting orifice; a vertical hollow tube fixed in, and extending above, said closure and also entering the upper part of the gas-tight body; an orifice tube, closed at its upper end and terminating in an orifice at its lower end, passing longitudinally through, and spaced away from the interior wall of, the hollow tube and mounted for vertical axial movement through said tube with the ends of the orifice tube extending beyond the ends of the hollow tube and the latter ends being in gaseous-fluid-tight engagement with the orifice tube; at least one gaseous-fluid passage in the wall of the orifice tube intermediate the extremities of the hollow tube; in the closure, an operating bore at such an elevation that rotation of the closure can place it in communication with the operating orifice so as to communicate therethrough with the operating conduit, and also a cross-cut gaseous-fluid passage with its ends communicating only with an inside surface of the neck and so positioned in the closure to establish communication between the connecting-tube orifice and the venting orifice when the radial operating bore of the closure is in communication with the operating orifice.

6. A manostat having a tubular gas-tight body with a pressure equalizing tube entering the interior thereof near, and extending upwardly away from, its bottom and terminating in the interior of said body in an orifice; the lower part of said body and around the lower part of the pressure equalizing tube being for holding a quantity of a non-wetting motile liquid inert to the gaseous fluids to be handled by the device; an open bottomed and closed top pressure-setting-and-adjusting float loosely telescoped over the pressure equalizing tube and to be held with its open lower end dipping into and supported by that liquid for motion vertically in relation to said tube; a neck portion at the upper end of the body; a closure rotatable about its vertical axis and in said neck portion and dimensioned to fit in gaseous-fluid-tight engagement therewith to close it; a connecting-tube connecting the bottom end of the pressure equalizing tube with the interior wall of the neck through a connecting-tube orifice passing through the neck and opening through the interior wall thereof; an exterior venting conduit leading outwardly from a venting orifice in the interior wall of the neck; an exterior operating conduit extending outwardly from and communicating with an operating orifice passing through the wall of the neck and spaced away from the venting orifice; a vertical hollow tube fixed in, and extending above, said closure and also entering the upper part of the gas-tight body; an orifice tube, closed at its upper end and terminating in an orifice at its lower end, passing longitudinally through, and spaced away from the interior wall of, the hollow tube and mounted for vertically axially longitudinal to and fro movement through it with the ends of the orifice tube extending beyond the ends of the hollow tube and the latter ends being connected in gaseous-fluid-tight engagement with the orifice tube, thereby enclosing a hollow cylinder between the interior wall of the hollow tube and the opposed portion of the exterior wall of the orifice tube; at least one gaseous-fluid passage in the wall of the orifice tube intermediate the extremities of the hollow tube; in the closure, a first, and also a second, operating bore, the inner end of each communicating with the hollow cylinder and each being at such an elevation that rotation of the closure can place either one of them selectively in communication with the operating orifices so that whichever one is thus selectively placed in communication therewith can establish communication through it between said cylinder and the operating conduit, and also a cross-cut gaseous-fluid passage with its ends communicating only with an inside surface of the neck and so positioned in the closure to establish communication between the connecting-tube orifice and the venting orifice only when the first operating bore of the closure is in communication with the operating orifice and to break the communication of the cross-cut passage with the connecting-tube orifice and venting orifice when the second operating bore is placed in communication with the operating orifice; the orifice tube and the pressure-equalizing tube being so aligned relative to one another that with sufficient excess pressure on the outside of the adjusting float, the underside of its closed top can close the orifice of the pressure-equalizing tube, and then with sufficient excess pressure on the underside of the adjusting float the top of its closure can close the orifice of the orifice tube.

7. A manostat having a tubular gas-tight body with a pressure equalizing tube entering its interior near, and extending upwardly away from, its bottom and having an orifice at its inner end; said gas-tight body serving to hold in its lower part and around the lower part of the pressure equalizing tube a quantity of a non-wetting motile liquid inert to the gaseous fluids to be handled by the device; an open bottomed and closed top pressure-setting-and-adjusting float loosely telescoped over the pressure equalizing tube and to dip into and be supported by the non-wetting liquid for motion vertically in relation to said tube; a neck portion at the upper end of the body; a closure rotatable about its vertical axis and in said neck portion and in gaseous-fluid-tight engagement with it to close it; a connecting-tube connecting the body-entering end of the pressure equalizing tube with the interior wall of the neck through a connecting-tube orifice passing through the neck and opening into its interior wall; an exterior venting conduit leading outwardly from a venting orifice in the inner wall of the neck; an exterior operating conduit extending outwardly from and communicating with an operating orifice passing through the wall of the neck and spaced away from the venting orifice; a vertical hollow tube fixed in, and extending above, said closure and also entering the upper part of the body of the manostat; an orifice tube, closed at its upper end and terminating in an orifice at its lower end, passing longitudinally through, and spaced away from the interior wall of, the hollow tube and mounted for vertical axial movement through it with the ends of the orifice tube extending beyond the ends of the hollow tube and the latter ends being in gaseous-fluid-tight engagement with the orifice tube, whereby the zone enclosed by the interior wall of the hollow tube and the part of the outer wall of the orifice tube between the ends of the hollow tube forms a hollow cylinder; at least one gaseous-fluid passage in the wall of the orifice tube intermediate the extremities of the hollow tube; in the closure, a first, and also a second, operating bore, the inner end of each communicating with the hollow cylinder and each being at such an elevation that rotation of the closure can place either one of them selectively in communication with the operating orifice so that whichever one is thus selectively placed in communication therewith can establish communication through it between said cylinder and the operating conduit, and also a cross-cut gaseous-fluid passage with its ends communicating only with an inside surface of the neck and so positioned in it to establish communication between the connecting-tube orifice and the venting orifice when the first operating bore of the closure is in communication with the operating orifice; and to break the communication of the cross-cut passage with the connecting-tube orifice and venting orifice when the second operating bore is placed in communication with the operating orifice; a fourth passage in the closure communicating with the interior of the closed body, and a fifth passage in the closure also communicating with that interior, both said passages being located relative to one another and the other passages in the closure that the fourth passage places the interior of the closed body in communication with the operating conduit when the fifth passage places that interior in communication with the connecting tube (to the pressure-equalizing tube) and all other passages in the closure are closed off; and a pressure-maintaining conduit at a level below the closure and above the highest level to be reached along the interior wall of the closed body by the liquid, leads from the interior of said body to outside of it; the orifice tube and the pressure-equalizing tube being so aligned relative to one another that with sufficient excess pressure on the outside of the adjusting float the underside of its top closure can close the orifice of the pressure-equalizing tube, and then with sufficient excess pressure on the underside of the adjusting float the top of its closure can close the orifice of the orifice tube.

References Cited in the file of this patent

UNITED STATES PATENTS

| | | |
|---|---|---|
| 1,136,108 | Curtis | Apr. 20, 1915 |
| 1,759,796 | Miles | May 20, 1930 |
| 1,804,981 | Harris | May 12, 1931 |
| 2,233,235 | Witthaus | Feb. 25, 1941 |
| 2,436,350 | Bader | Feb. 17, 1948 |
| 2,458,759 | Abell | Jan. 11, 1949 |
| 2,482,167 | Gilmont | Sept. 20, 1949 |
| 2,702,047 | Gilmont | Feb. 15, 1955 |

UNITED STATES PATENT OFFICE
CERTIFICATE OF CORRECTION

Patent No. 3,035,600                                                  May 22, 1962

Roger Gilmont

It is hereby certified that error appears in the above numbered patent requiring correction and that the said Letters Patent should read as corrected below.

Column 2, line 57, for "37-40" read -- 36-40 --; column 5, line 48, column 6, line 3, and column 7, line 65, for "monostat" each occurrence, read -- manostat --; column 7, line 56, for "The" read -- Then --; column 10, line 61, for "orifices" read -- orifice --.

Signed and sealed this 16th day of October 1962.

(SEAL)
Attest:

ERNEST W. SWIDER                                        DAVID L. LADD
Attesting Officer                                           Commissioner of Patents